United States Patent

Maischner et al.

[11] Patent Number: 5,486,677
[45] Date of Patent: Jan. 23, 1996

[54] METHOD OF AND APPARATUS FOR MACHINING WORKPIECES WITH A LASER BEAM

[75] Inventors: Dora Maischner; Alexander J. Drenker, both of Aachen; Peter Abels, Alsdorf; Eckhard Beyer, Aachen, all of Germany

[73] Assignee: Fraunhofer-Gesellschaft zur Forderung der Angewandten Forschung E.V., Munich, Germany

[21] Appl. No.: 107,763
[22] PCT Filed: Feb. 19, 1992
[86] PCT No.: PCT/DE92/00115
 § 371 Date: Aug. 19, 1993
 § 102(e) Date: Aug. 19, 1993
[87] PCT Pub. No.: WO92/14578
 PCT Pub. Date: Sep. 3, 1992

[30] Foreign Application Priority Data

Feb. 26, 1991 [DE] Germany ............. 41 06 007.5

[51] Int. Cl.⁶ ............................................. B23K 26/00
[52] U.S. Cl. ............................................. 219/121.83
[58] Field of Search ............. 219/121.6, 121.61, 219/121.83, 121.63, 121.64; 356/318

[56] References Cited

U.S. PATENT DOCUMENTS

| | | | |
|---|---|---|---|
| 4,690,558 | 9/1987 | Tsunoyama et al. | 356/318 |
| 4,817,020 | 3/1989 | Chaude et al. | 364/557 |
| 4,818,841 | 4/1989 | Sliva et al. | 219/121.83 |
| 4,960,970 | 10/1990 | Schneiter | 219/121.6 |
| 5,045,669 | 9/1991 | Ortiz, Jr. et al. | 219/121.83 |
| 5,272,312 | 12/1993 | Jurca | 219/121.83 |

FOREIGN PATENT DOCUMENTS

| | | | |
|---|---|---|---|
| 344339 | 12/1989 | European Pat. Off. | 219/121.83 |
| 93/03881 | 3/1993 | WIPO | 219/121.83 |

*Primary Examiner*—Geoffrey S. Evans
*Attorney, Agent, or Firm*—Herbert Dubno

[57] ABSTRACT

A method of machining workpieces with a laser beam wherein the machining process, in particular the melting depth or the through-melting distance is monitored by detecting an optical and/or acoustical signal created by an unshielded laser-induced plasma or vapor. In order to receive monitoring date which as much as possible is independent of signal variations in the process the signals are subjected to a frequency analysis and the average amplitudes $(A_x, A_y)$ of two different frequency bands $(x, y)$ of the analyzed frequencies are used with a predetermined calculation function to determine a rating value (B).

6 Claims, 4 Drawing Sheets

LOAD DENSITY SPECTRA

METHOD OF AND APPARATUS FOR MACHINING WORKPIECES WITH A LASER BEAM

CROSS REFERENCE TO RELATED APPLICATIONS

This application is a national phase of PCT/DE 92/00115 filed 19 February 1992 and based, in turn, upon German national phase application P 41 06 007.5 filed 26 February 1991 under the International Convention.

Field of the Invention

The invention relates to a method of machining workpieces with a laser beam wherein the machining process, in particular the weld penetration depth or the degree of throughwelding, is monitored by detecting an optical and/or acoustical signal created by an unshielded laser-induced plasma or vapor.

Background of the Invention

A method of cutting workpieces, in particular the joining of plates with a laser beam, is known from DE 38 20 848 A1 having the above-given characteristics. It makes possible a determination of the degree of through welding in that there is a sudden fluctuation of the plasma light and/or of the plasma noise which can be reduced to an optical and/or acoustic signal indicating the degree of through welding. This known process is critical with respect to evaluation of the signals. In particular there are variations that are impossible to account for that are due to the geometry and/or the process parameters so that use of the known method in a wide range of applications is difficult, that is it cannot be applied to a wide range of processes.

In addition it is known from SPIE Vol. 801, 1987, p. 340 to divide the radiation from a cutting process with a radiation splitter into the visible range and the infrared range. Both parts are detected separately by photodiodes. The relationship of the steady part of the visible signal is calculated with respect to the infrared signal. It grows as the temperature increases at the cutting front. The calculation can be used to influence the cutting speed. Even here there are the above-mentioned dependencies on the geometry of the workpiece and/or of the process parameters which has a bad effect on the use of the method.

Object of the Invention

It is an object of the present invention so to improve a process with the above-mentioned features that generally valid criteria are obtained for proceeding with the machining and for machining characteristics.

Summary of the Invention

This object is obtained in that the signals are subjected to a frequency analysis and the average amplitudes of two different frequency bands of the analyzed frequencies are used with a predetermined calculation function to determine a rating or evaluation value.

Thus with this process the signals or their average values are not themselves used in order to obtain a monitoring characteristic, but instead they are subjected to a frequency analysis. Therefore a particular value of the light intensity, of the sound amplitude, or of the frequency of a particular signal are not used directly in order to determine the degree of throughwelding. Instead one or more values are subjected to a frequency analysis so that the results of this frequency analysis produce a band of analyzed frequencies which are evaluated. The evaluation is done such that the average amplitudes of two different frequency bands are drawn on to derive a rating value. This derivation is done with a calculation function that must be determined in advance. The derived rating value is then used to interpret the machining process and/or the machining results. In particular the following can be detected:

a change of the welding depth, a change of the degree of throughwelding, a change from surface welding to throughwelding, a change of the focus point, a change of the welding speed, a change of the laser output, formation of spray, formation of a hole resulting from increased spattering, a change of the gap on joining plates in end or lapping contact, a change in the protective-gas or shielding gas feed, i.e. a change in the influencing of the laser-induced plasma and of the plasma absorption (e.g. plasma shielding), or increased pore formation or seam collapse.

It has been found to be particularly advantageous for the predetermined calculation function to be a quotient formation.

In order to get evaluation results as soon as possible and to introduce these results in particular into the process control, the method provides that the frequency analysis is done by a fast Fourier transformation. This is the optimum calculation in a digital computer for reducing the calculation time. A particular advantage is obtained by using the process of real-time analyses, e.g. in the neighborhood of less than a second.

In order to be able to exclude the influence of stochastic variations in the plasma formation, according to the method, average values are derived from the evolution of the evaluation function with respect to time for monitoring the machining process.

In the above-described method the devices for monitoring the plasma formation or the machining location are located laterally outside the laser-beam focussing device. This necessitates an additional expense for a holder which is undesired just in the region of the laser-beam focussing device since as a rule other devices such as gas feeds or the like must be located there. In addition such holders prevent the use of devices for moving the workpiece in three dimensions. An apparatus for carrying out the above-described process is thus preferably so set up that a detector is joined to the beam path of the laser-beam focusing device or built into it. As a result the information from the laser-induced plasma or from the vapor is taken up by the optics of the laser-beam focussing device and can be conducted regardless of its formation where the detector is not a problem.

The apparatus is so constructed that the detector is as needed a photodetector provided with an optical filter and/or an acoustic detector. Photodiodes or photomultipliers can be used for example as photodetectors. Optical filters can be band-pass and/or edge filters which for example are transparent in the blue wave length range. Thus a selection of the optical signals created by the plasma or the vapor is taken to simplify the frequency analysis and in particular accelerates and acts as a means for taking into account those signal regions in which the frequency analysis is particularly remarkable so that the variations in the changing of the rating value are correspondingly remarkable. A microphone can be used for example as acoustic detector. Even an influencing of the used frequency range by means of frequency analysis is possible, e.g. by the use of a corresponding filter.

The fast Fourier transformation is preferably carried out by connecting analyzer to the detector which analyses the detector's signal with the fast Fourier transformation and whose output has two band-pass filters which have different variable frequency bands. The two band-pass filters connected to the analyzer determine the selection of frequency bands over the entire analyzed spectrum which are drawn on to obtain the rating values.

According to the invention the outputs of the band-pass filters are connected to a circuit which forms a quotient and which is connected with a display and/or with a control or regulating device handling the machining process on-line. The circuit delivers at its output the desired rating value which is determinative of or controls the welding depth, the degree of throughwelding, or the like. This rating value is displayed by the display device and/or it is used for on-line influencing of the machining process.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
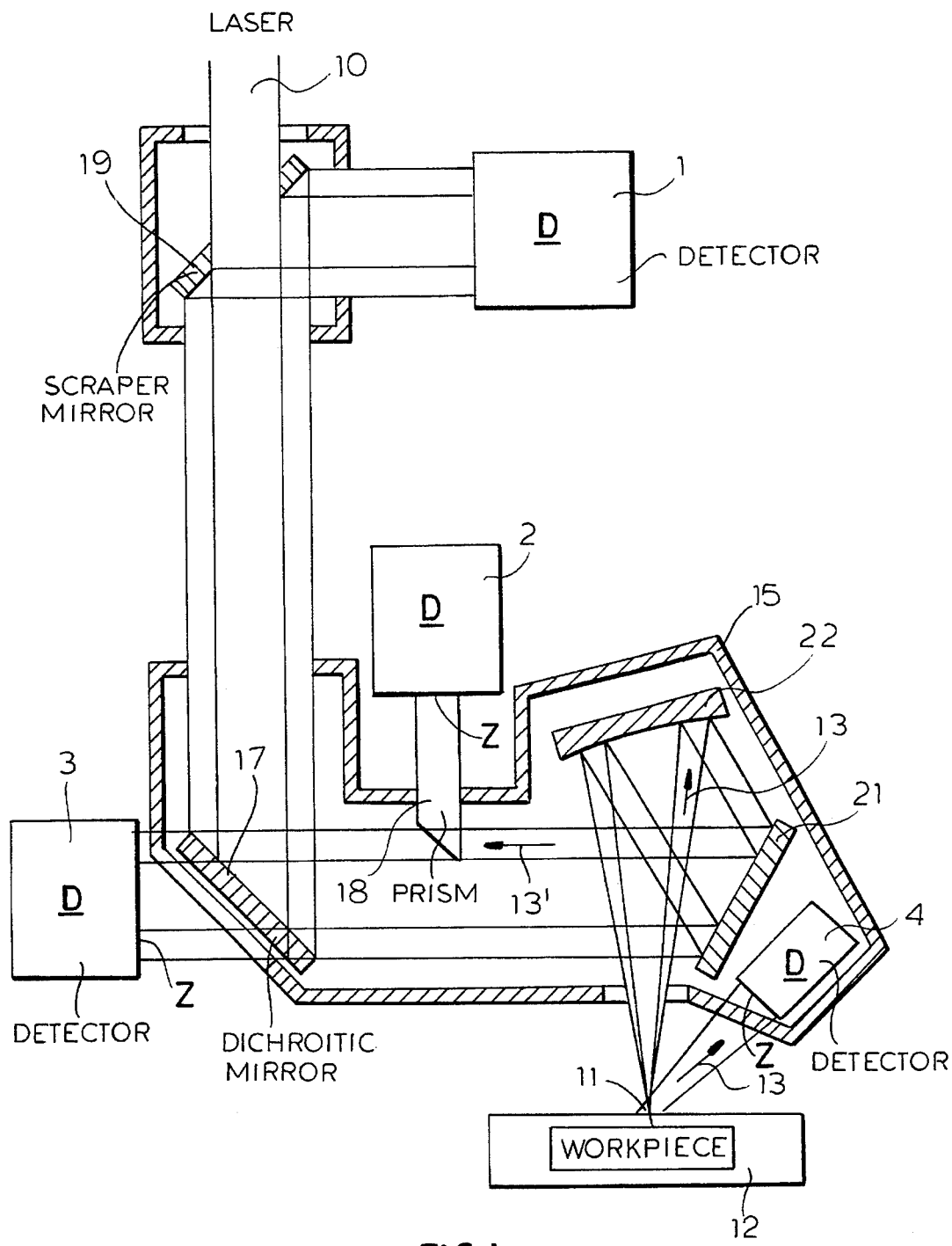
FIG. 1 is a diagram of the arrangement of detectors for receiving optical and/or acoustic signals from the plasma or vapor Of the machining location.

The workpiece shown schematically in FIG. 1 is formed for example of two workpiece parts to be joined to each other by a welding operation. It can also be a workpiece that is to be cut by the machining. Even such machining operations as material removal or scoring are possible, as long as the process and/or the workpiece must be monitored.

A laser beam 10 serves for machining the workpiece, the beam being fed to the workpiece from a laser through a laser-beam focussing device 15. The laser beam is deflected inside the laser-beam focussing device 15 with mirrors 17, 21, and 22 and is focussed by the last-named mirror 22 such that a machining location 12 is formed on the workpiece. Light 13 created at the working location or by the plasma or vapor moves back in the laser-beam focussing device 15 on the focussing mirror 22 and the deflecting mirrors 21 and 17. In order to use the laser-beam focussing device 15 for detecting the emitted light 13, an output prism 18 is engaged in the beam path 13' of the emitted light moving inside the device 15, or the mirror 17 is made dichroic so as to let through a part of the light falling on it, namely the portion of the light emitted from the machining location 12. The detectors 2 and 3 mounted on the prism 18 or on the mirror 17 can be at predetermined locations, that is remote from the laser-beam focusing device 15 so that the later can be moved without regard to the detectors 2 and 3. FIG. 1 further shows a scraper mirror 19 in the beam path of the emitted or reflected light which is fed in through this mirror 19 to a detector 1.

It is also possible to observe the machining process directly in which case a detector 4 is integrated into the laser-beam focussing device 15. The integration is such that the angle of the detector 4 to the vertical or to the laser beam 10 is as small as possible. It is determined by the physical requirements of the laser-beam focussing device 15.

All of the detectors 1 through 4 are built to work the same, as indicated in the drawing by reference D.

Figure 2A:
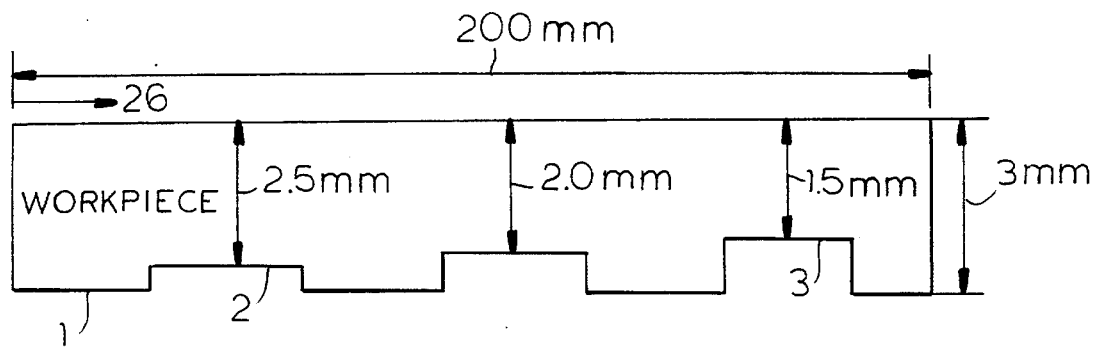
FIG. 2a is a section of a workpiece subject to a test.

FIG. 2a shows a section through a workpiece which was welded with a device according to FIG. 1 in the direction of arrow 26, namely by formation of a laser-induced plasma at the machining location 12. One of the detectors 1 through 4 takes signals from the plasma, for example optical signals and in particular light-strength variations, which are created as a result of the fluctuations of the plasma.

Figure 2B:
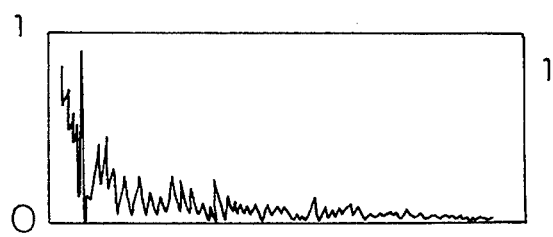
FIGS. 2b through 2d are diagrams of signal amplitudes gained in a frequency analysis according to frequency.
Figure 2C:
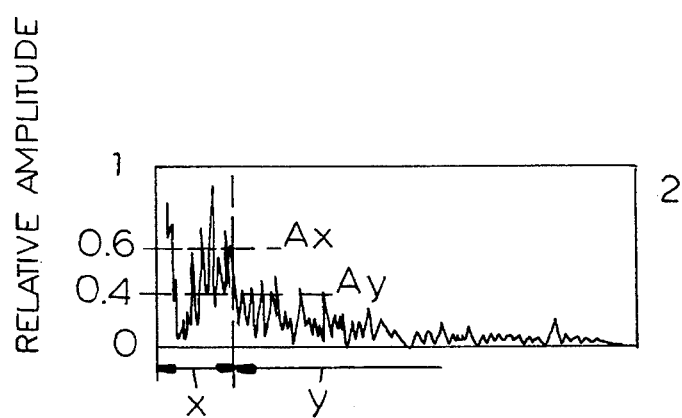
Figure 2D:
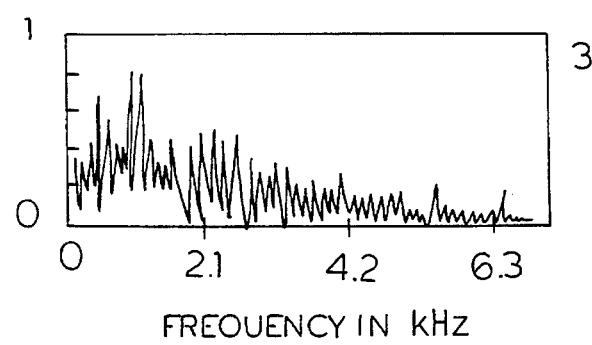
Figure 5:
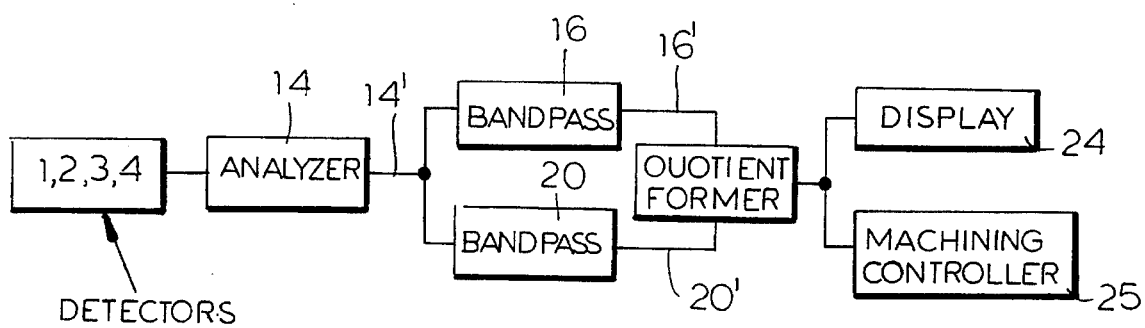
FIG. 5 is a block diagram of a system for detecting the extent of throughwelding.

These signals travel according to FIG. 5 into the FFT analyzer 14 which calculates and/or displays for the detector locations 1, 2, and 3 the amplitudes shown in FIGS. 2b through 2d. By comparison it is clearly visible that the frequencies are markedly different with different workpiece thicknesses. There are thus different signal spectra depending on the workpiece thickness and the welding depth. This means that the welding depth can be determined basically by a frequency analysis of the signals obtained from the plasma.

The frequency band changes place markedly in the case when a workpiece is welded through and thus when the welding capillary at the base of the seam of the workpiece or of the welding seam is opened on the underside of the workpiece. The change is particularly sudden so that it can be an exceptional measurement for influencing the welding process.

FIGS. 2b through 2d indicate that the signal amplitudes for the various frequencies at the relevant detector locations 1 to 3 are very different. In addition the curves of FIGS. 2b through 2d are not constant, but depend very strongly upon the stochastic changes in the vapor capillaries or in the plasma. Melt bath movements are particularly influential on the detected signals. It is therefore necessary to derive a rating value whose dependence on time can be taken into account or as much as possible canceled out. As a result in the FIG. 2b through FIG. 2d frequency ranges of 0 to for example 6.3 kHz there are two frequency bands which are shown in FIG. 2b at x and y and for example include the frequency ranges from 0 to 1 kHz and >1 Khz. To this end the FFT analyzer is connected at its output 14' with two parallel band-pass filters 16 and 20. These band-pass filters permit one to set the frequency bands. Any other advantageous setting of the frequency bands is possible in order to obtain a rating value which delivers the best weighted results.

Figure 3A:
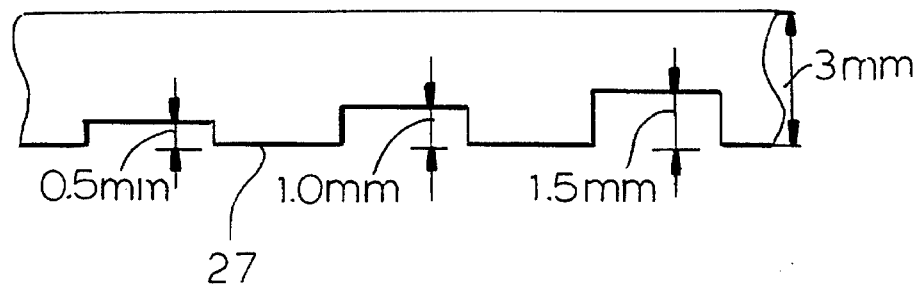
FIG. 3a is a section of the workpiece of FIG. 2a illustrating another aspect of the invention.
Figure 3B:
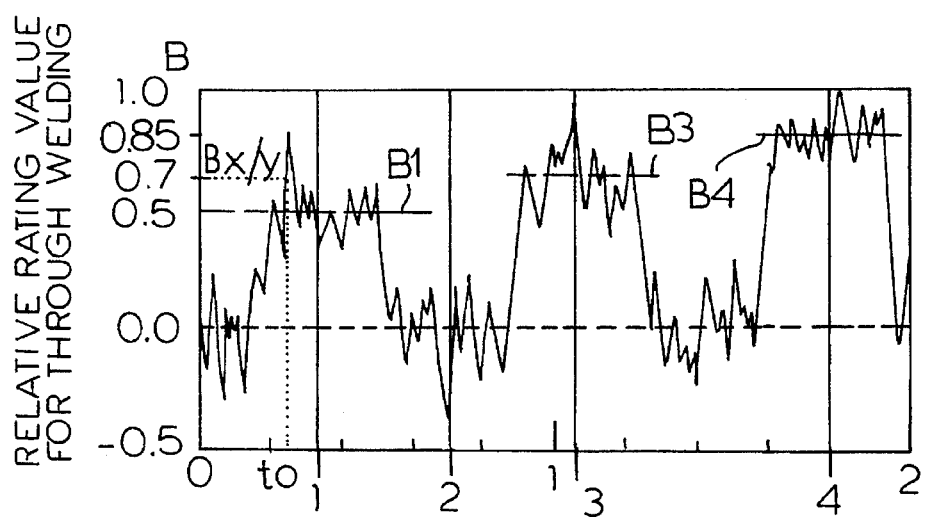
FIG. 3b is a diagram which shows a relationship of the rating value for the throughwelding of the workpiece shown in FIG. 3a, FIGS. 4a and 4b are graphs showing the dependence with respect to time of the advance of a machining operation and the rating value for the degree of throughwelding.

FIG. 2b shows that the average amplitude Ax is substantially greater than 0.6 while the average amplitude A1 in the frequency region y is 0.4. This is used in the present case by forming a quotient for deriving a rating value B to which end the band-pass filters 16 and 20 are connected at their outputs 16' and 20' to a circuit 23 for forming a quotient. In the present case the quotient Az/Ax is formed. This gives a relationship By/x of 0.66 at a time $t_0$. This value Bx/y is shown in FIG. 3b for the time $t_0$. All of the rating values B are correspondingly calculated in this manner to produce the rating values with respect to time shown in FIG. 3b. In particular for a location 2, that is for a workpiece thickness of 3 mm, the rating value is zero. On the other hand the rating values B1, B3, and B4 which are average values of the valuations levels for the recesses shown in FIG. 3a at detectors 1, 3, and 4 are markedly different from one another so that the rating value can be a measurement of the welding depth. The above-given average values are 0.85 for 4, 0.7 for 3, and 0.5 for 1 even though the welding depth is almost through to the underside of the workpiece. If this workpiece underside 27 is reached by the welding, the capillary opens at the base of the seam so that the rating value jumps from somewhat less than 0.5 to zero. This is a very clear indication of through welding, namely of the opening of the capillary at the base of the seam.

The present method thus determines the welding depth and according to it the degrees of throughwelding and above all the transition from welding to throughwelding.

Figure 4A:
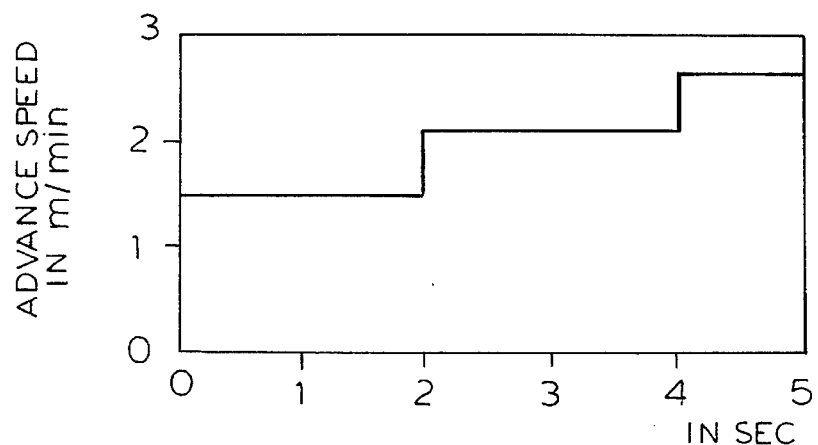
Figure 4B:
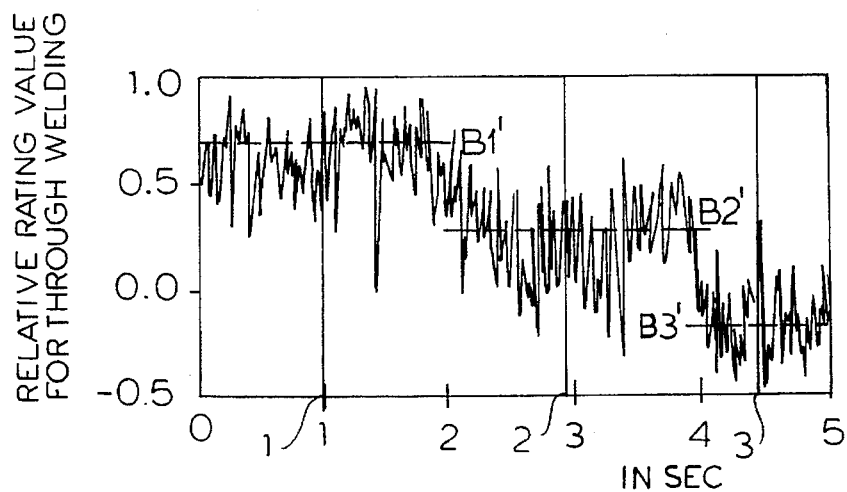

Independent of the above-described method for determining the rating value for the welding depth and for the throughwelding extent it has been determined that even other parameters of the process are recognizable as substantially detectable influences when the rating value is obtained according to the above-described method. FIG. 4a shows changes of the advance speed as a function of time. These changes are changeable at will. FIG. 4b shows the dependence of the rating values on time for the advance speeds of regions 1, 2, and 3. The rating values B1', B2' and B3' vary markedly from one another. This illustrates that the throughwelding extent and or the rating values for the degree of throughwelding can be used to change the advance speed in order to maintain the degree of throughwelding constant.

In summary it can be seen that by a comparison of advantageously selected frequency bands of the signals it is possible, namely for example by quotient formations, to determine changes in the welding bath and in the geometry of the vapor capillaries and to derive rating values which make it possible to follow the process and/or influence the process. As a result FIG. 5 shows in the quotient-forming circuit 23 a display 24 and a control or monitoring device 25 so that by means of the latter it is possible to machine on line when the average values B1, B3, B4 or B1', B2' or B3' according to FIGS. 3b and 4b and the rating value B are drawn on.

We claim:

1. A method of monitoring machining of a workpiece which comprises the steps of:

(a) directing a laser beam at said workpiece and melting same to a melting depth in the presence of a laser-induced signal-emitting plasma or vapor at a machining location;

(b) detecting signals emitted by said plasma or vapor at said location;

(c) subjecting the detected signals to frequency analysis and dividing the frequency analyzed signals into two different frequency bands;

(d) averaging amplitudes over said bands to obtain two amplitude values of average amplitudes each derived from one of said bands; and (e) monitoring said depth by calculating a rating value from said amplitude values by forming a quotient therefrom.

2. The method defined in claim 1 wherein said frequency analysis is a fixed fourier transformation.

3. The method defined in claim 2 wherein the machining is controlled in response to said rating value.

4. The method defined in claim 2 wherein said laser beam is directly at said workpiece by reflecting it onto said workpiece from at least one mirror, said signals emitted by said plasma or vapor being optical signals back reflected from said mirror onto a detector.

5. The method defined in claim 2 wherein said signals are optical signals emitted from said location directly to a detector.

6. The method defined in claim 2, further comprising the step of displaying said rating value.

* * * * *